United States Patent [19]
Inomata et al.

[11] 3,819,162
[45] June 25, 1974

[54] GAS CUTTING MACHINE
[75] Inventors: Nobuhiro Inomata, Kanagawa; Eiji Ohba; Tomowo Ogiwara, both of Yokohama, all of Japan
[73] Assignee: Nippon Kokan Kabushiki Kaisha, Tokyo, Japan
[22] Filed: Nov. 8, 1972
[21] Appl. No.: 304,837

[30] Foreign Application Priority Data
 Nov. 10, 1971 Japan.............................. 46-89679

[52] U.S. Cl............ 266/23 M, 266/23 K, 266/23 L
[51] Int. Cl............................................... B23k 7/10
[58] Field of Search..... 266/23 R, 23 E, 23 K, 23 L, 266/23 M, 23 NN; 90/13 R

[56] References Cited
UNITED STATES PATENTS
3,132,291   5/1964   Neander et al. .................. 266/23 X
R26,393    5/1968   Daugherty ............................ 90/13

OTHER PUBLICATIONS
Vol. II of "Projective Geometry" by Veblen and Young, 1918, theorem I, pp. 287.

*Primary Examiner*—Roy Lake
*Assistant Examiner*—Paul A. Bell
*Attorney, Agent, or Firm*—Flynn & Frishauf

[57] ABSTRACT

A gas cutting machine comprising a truck; a pole rotatably erected thereon, a sensor following the guide plane of a block structure; a torch head movable together with the sensor along the pole and rotatable in the same direction and through the same angle as the sensor; and control mechanism for causing the truck, sensor and torch head to run at a prescribed speed and properly adjusting the angle through which the sensor and torch head are made to rotate, thereby effecting the thermal cutting of the components of block structures to accurate dimensions.

13 Claims, 15 Drawing Figures

GAS CUTTING MACHINE

This invention relates to a gas cutting machine for steel structures and more particularly to a gas cutting machine capable of thermally cutting the ends of components of block structures such as the inner construction of a hull at a fixed speed while forming weldable edges at said cut ends, thereby providing erection joints at which block structures are to be connected with each other.

If all the components of a block structure could be initially machined without any dimensional error and assembled into the block structure without any assembling error, it will be understood that, however large it might be, the assembled block structure would have a predetermined size and shape even if the block structure was not further machined after the assembly. However, it is practically impossible to make the components without any minute dimensional error. Nevertheless, the forceful application of a rigid dimensional tolerance would give rise to high manufacturing cost. Further, the welding of the components into a block is unavoidably accompanied with assembling errors due to the components being subjected to distortion during welding. After the assembly of components, therefore, one block must always be finally machined to the required dimensions for exact alignment with the adjacent blocks. Customary practice is to preassemble components so as to obtain block structures slightly larger than designed and later thermally cut the required portions of the components to prescribed dimensions. Heretofore, said thermal cutting has been manually undertaken, resulting in extremely low operating efficiency and presenting considerable difficulties in thermally cutting block components to accurate dimensions while forming close-fitting weldable edges at the end portions of block components thus cut.

It is accordingly the object of this invention to provide a gas cutting machine capable of thermally cutting the ends of components constituting block structures to accurate dimensions while forming weldable edges at said cut ends.

SUMMARY OF THE INVENTION

According to the invention, there is provided a gas cutting machine comprising a truck movable in a first direction; a pole pivoted at one end thereof on the truck and extending in a second direction perpendicualr to the first direction; a sensor rotatable about a first shaft extending in a third direction perpendicular to the first and second directions and also about an axis perpendicular to said shaft so as to follow the guide plane of a block structure by moving along the pole; means fixed to one end of the first shaft so as to cause the sensor to rotate about said axis; a first torch head provided with a first cutting torch, said torch rotating about a second shaft disposed parallel with the first shaft and movable with the first shaft along the pole, and moving in a fourth direction along a plane including the normal of the guide plane of the block structure and parallel with the third direction and also along a plane perpendicular to the first and second directions, with the nozzle of said torch always oriented in the fourth direction; transmission means for transmitting the rotation of the first shaft to the second shaft to cause said second shaft to rotate in the same direction and through the same angle as said first shaft; a control mechanism for causing the sensor to rotate about the first shaft so as to render said sensor parallel with the guide plane of the block structure and for regulating the speed at which the truck is made to run in the first direction according to the angle through which the sensor rotates about the first shaft and said axis and also the speed at which the first torch head is made to move along the pole, thereby allowing the sensor to move at a predetermined constant speed along a plane parallel with the first and second directions, while following the guide plane of the block structure component.

There will now be described this invention by way of example with reference to the accompanying drawings in which.

Figure 3:
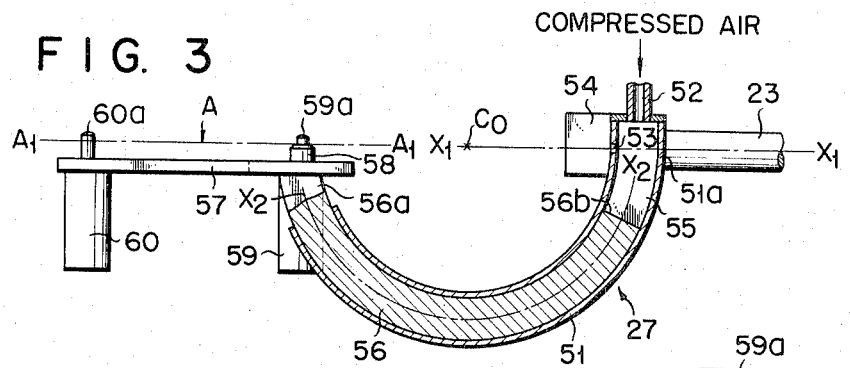
Figure 4:
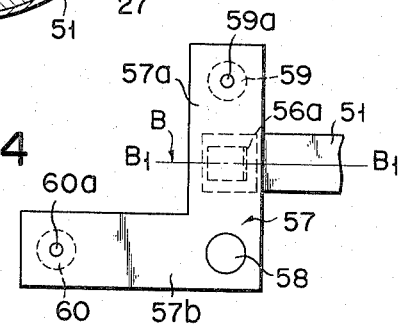
Figure 5:
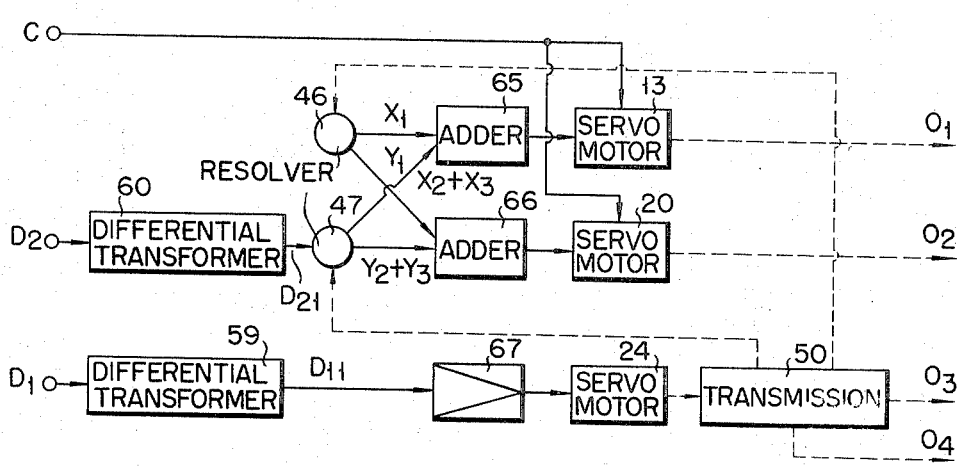
Figure 6:
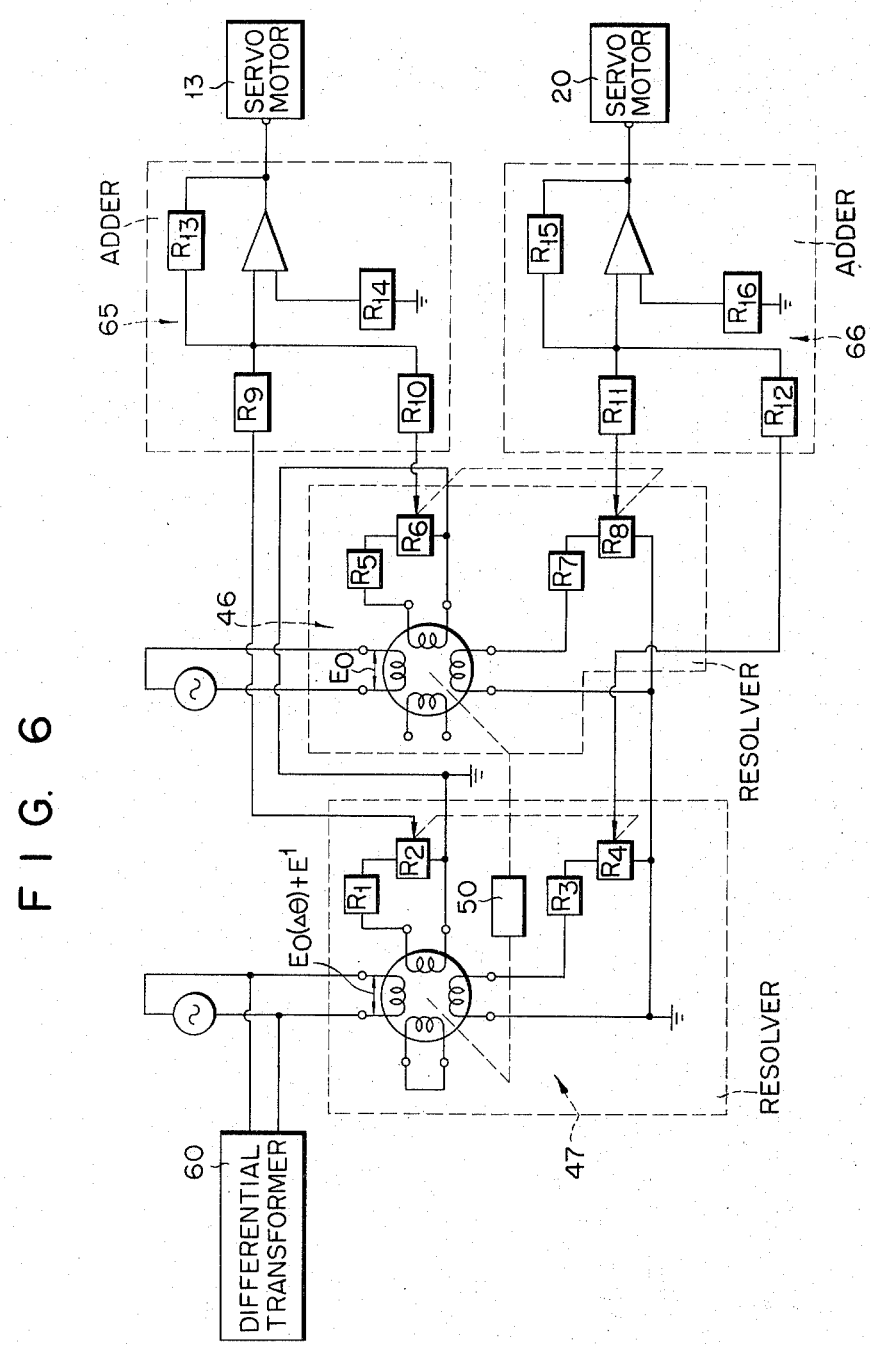
Figure 7:
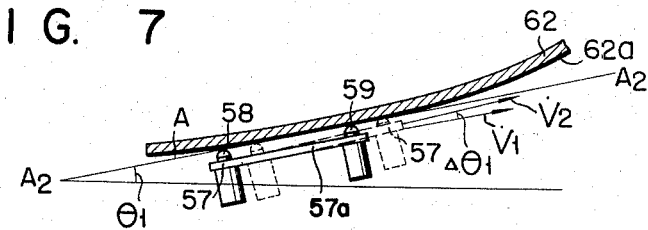
Figure 8:
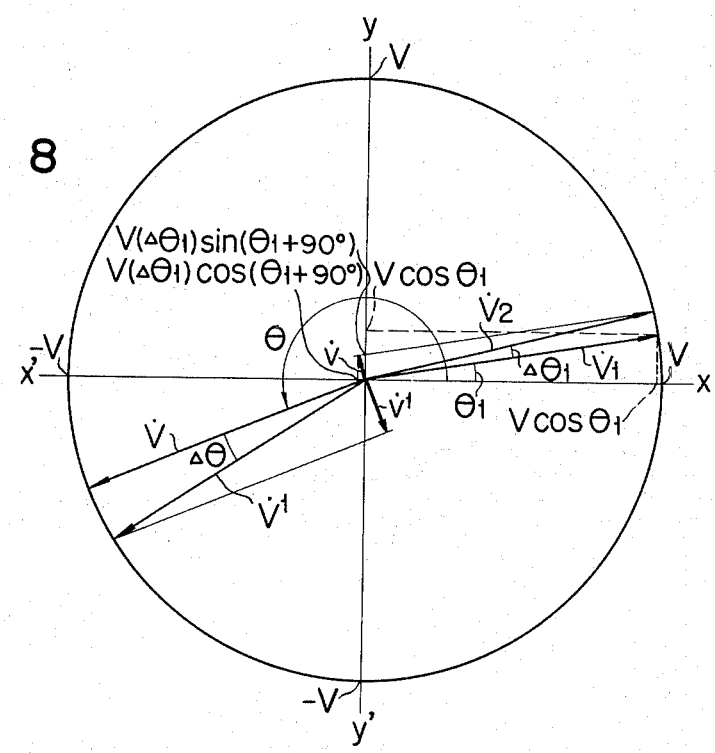
Figure 9:
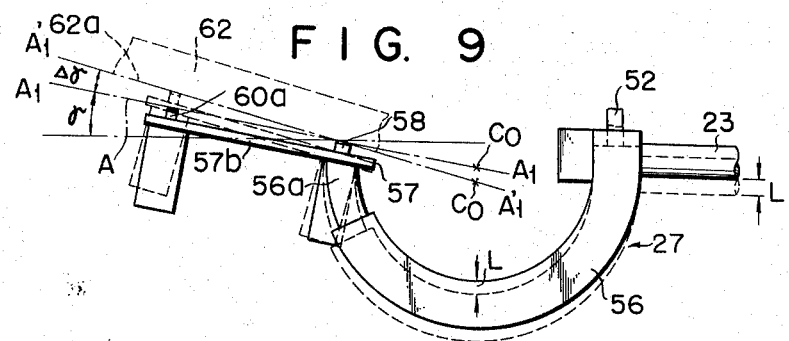
Figure 10:
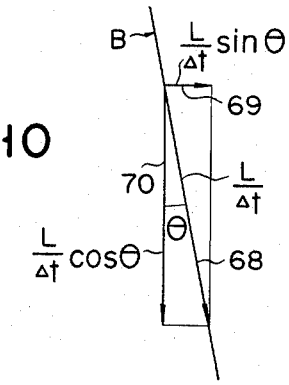
Figure 11:
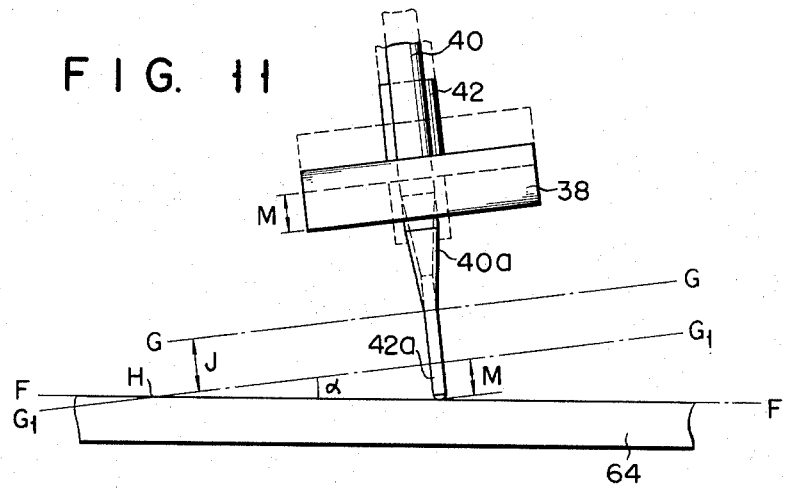
Figure 12:
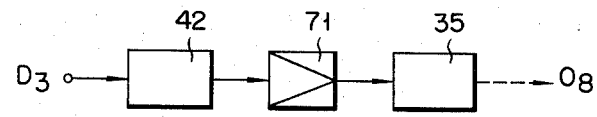
Figure 13:
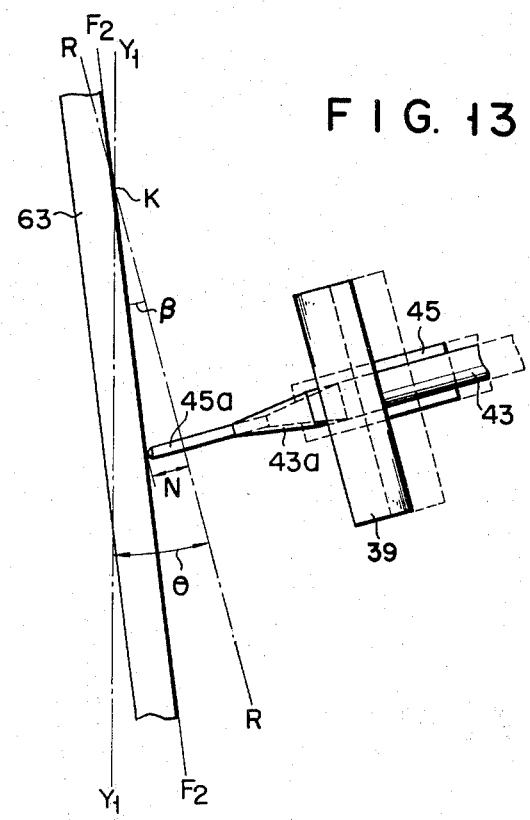
Figure 15:
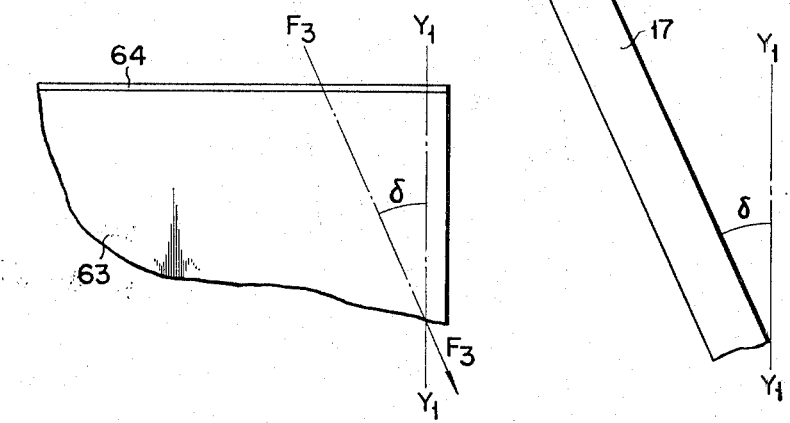
Figure 14:
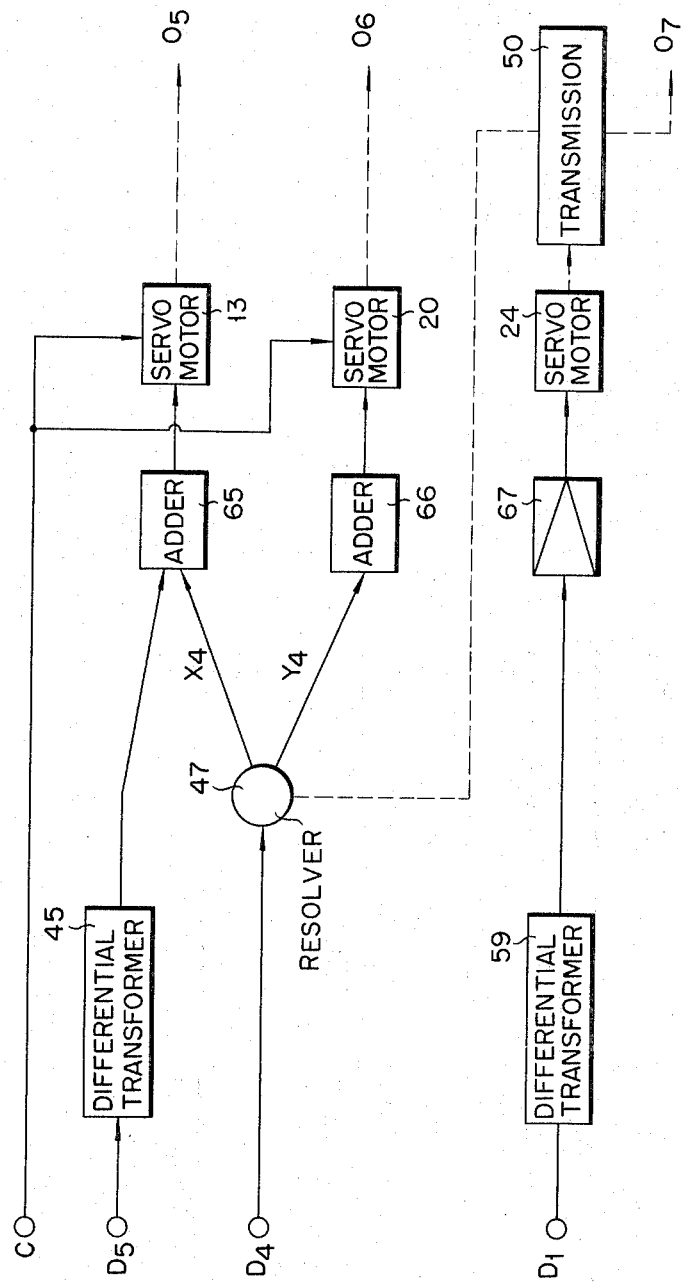

FIG. 3 presents a longitudinal sectional view of an arcuate plunger-cylinder assembly and an elevation of a sensor;

FIG. 4 is a plan view of the sensor of FIG. 3;

FIG. 5 is a block circuit diagram of a control mechanism for cutting a plate of a hull block with the sensor made to follow the guide plane of said hull block;

FIG. 6 is a concrete circuit arrangement of the resolvers and adders of FIG. 5;

FIG. 7 illustrates the condition in which the sensor moves along the guide plane of the hull block structure;

FIG. 8 is a vector chart given in explanation of FIG. 7;

FIG. 9 indicates the operation of the plunger-cylinder assembly of FIG. 3;

FIG. 10 is a vector representation of the velocity at which the torch head moves for cutting a stiffener;

FIG. 11 shows the manner in which the torch head has its position adjusted to cut plate;

FIG. 12 indicates a control mechanism for effecting the adjustment of FIG. 11;

FIG. 13 presents the manner in which the torch head has its position adjusted to cut a stiffener;

FIG. 14 is a block circuit diagram of a control mechanism for cutting the stiffener; and FIG. 15 illustrates the condition in which a stiffener is cut slantwise by inclining the pole.

Now let an orthogonal coordinate system be assumed in which X and Z axes are provided in a horizontal plane and Y-axis in a vertical plane.

A truck 11 carries the whole of a gas cutting machine according to this invention, and is made to run on tracks 12 laid parallel with the X-axis or an axis along a first direction. The truck 11 moves by a servo motor 13 fitted thereto and a proper drive transmission device 14, which is indicated as a simple assembly of a rack 14b laid parallel with the tracks 12 and a pinion 14a rotated by the servo motor 13 in engagement with the rack 14b. However, said drive transmission device 14 may comprise any other suitable means. A pole 17 has its bottom portion pivotally fitted to the truck 11 by means of a shaft 16 so as to rotate in a plane perpendicular to the X – Z plane. The pole 17 normally vertically extends along the Y axis or an axis in a second direction, but, where required, can be inclined from said vertical position to any desired extent by a hydraulic jack 18 disposed between the truck 11 and pole 17.

A control box 19 is made vertically slidable along the pole 17 by a servo motor 20 in said box 19. On the pole 17 in its longitudinal direction is laid a rack 21, with which there is engaged a pinion 22 driven by said servo motor 20. Operation of this motor 20 causes the control box 19 to move vertically along the pole 17 by the joint action of said rack 21 and pinion 22.

A first shaft 23 has its forward part carried by the control box 19 and its rear part so disposed as to extend parallel with the Z axis or a third direction. The control box 19 contains another servo motor 24. A gear 25 fitted to said servo motor 24 engages a gear 26 attached to the forward end of the first shaft 23. To the rear end of the first shaft 23 is fixed one end of the later described arcuate plunger-cylinder assembly.

Rearward of the control box 19 extends a second shaft 28 parallel with the first shaft 23. The forward part of the second shaft 28 is carried by the control box 19, the end of said forward part being fitted with a gear 29, which engages the gear 26 through an intermediate gear 30. When the first shaft 23 is made to rotate by the servo motor 24, the second shaft 28 is rotated in the same direction and through the same angle as the first shaft 23 by the joint action of the gears 26, 30 and 29.

To the rear end of the second shaft 28 is fixed a rotary member 31 which is made rotatable therewith. On the backside of the rotary member 31 is provided a slidable member 32 which can vertically slide by dovetail engagement with said rotary member 31 under the condition of FIG. 1. On one side of the slidable member 32 is laid a rack 33 parallel with the direction in which said slidable member 32 is made to slide. A servo motor 35 fixed to the rotary member 31 drives the slidable member 32 through a gear 34 and the rack 33 meshing therewith.

Figure 1:
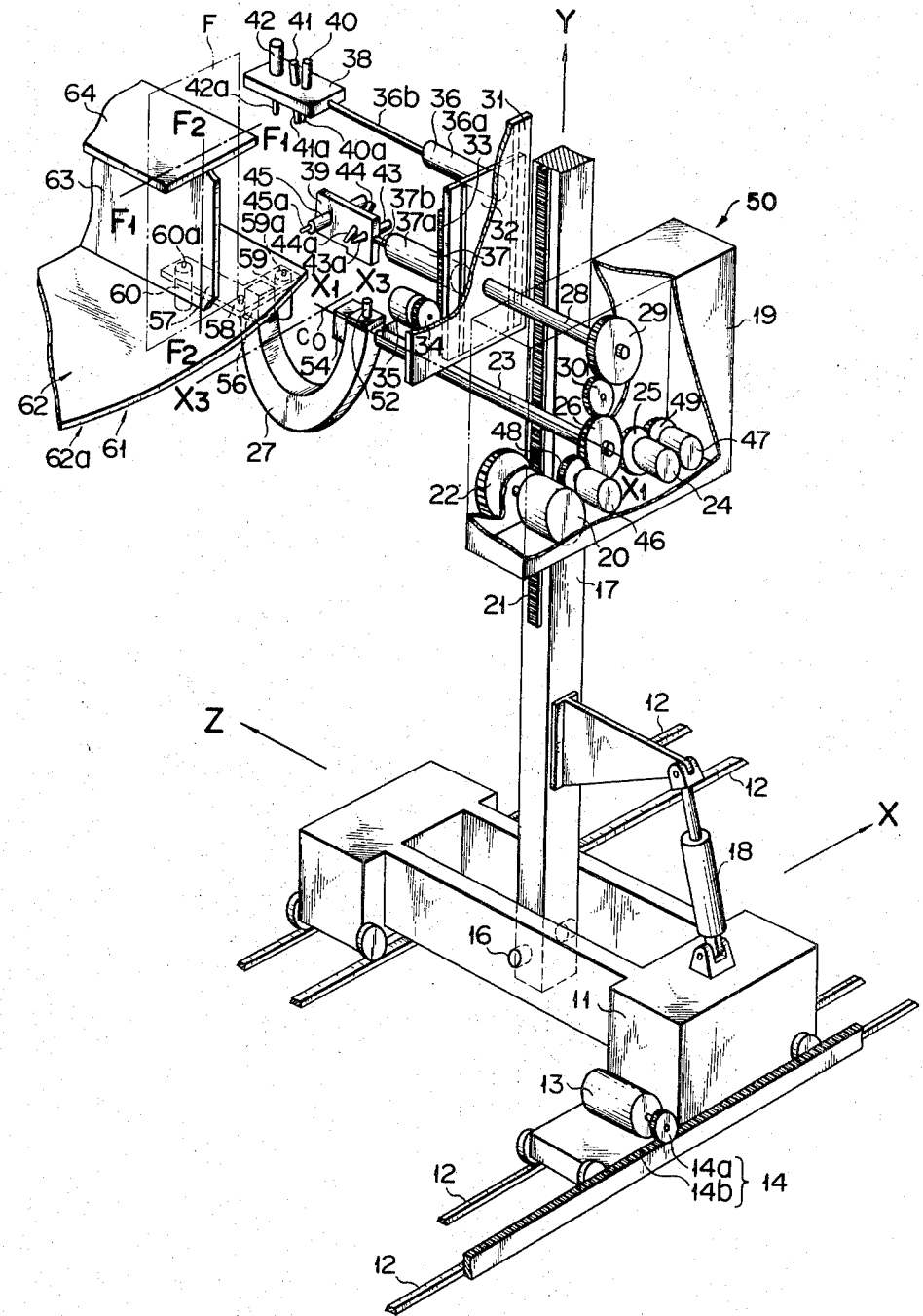
FIG. 1 is a schematic perspective view of a gas cutting machine according to an embodiment of this invention.
Figure 2:
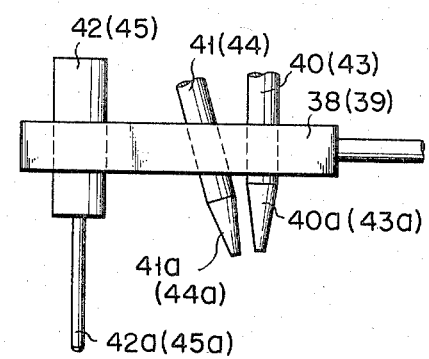
FIG. 2 is an elevation of a torch head included in the gas cutting machine of FIG. 1.

To the slidable member 32 are fixed the cylinders 36a and 37a of a pair of plunger-cylinder assemblies 36 and 37. The plungers 36b and 37b of said assemblies 36 and 37 can reciprocate through said cylinders 36a and 37a along the Z axis. To the free ends of the plungers 36b and 37b are fixed first and second torch heads 38 and 39 respectively. As shown in FIGS. 1 and 2, the first torch head 38 is provided with a first cutting torch 40, a first edge preparation torch 41 and a differential transformer 42 for correcting the position of a nozzle 40a of cutting torch 40. The nozzle 40a of the first cutting torch 40 is disposed parallel with the direction in which the slidable member 32 moves, while the nozzle 41a of the first edge preparation torch 41 is inclined toward the nozzle 40a of said first cutting torch 40 by a prescribed angle for edge preparation. The axes of the differential transformer 42, and nozzles 40a and 40b are arranged in a plane parallel with the Z axis. The differential transformer 42 has a downwardly biased stylus 42a projecting in the same direction as the nozzle 40a and movable in parallel with the axis of the nozzle 40a. The axes of the nozzles 40a, 41a and the stylus 42a are on a flat plane.

The second torch head 39 includes a second cutting torch 43 having a nozzle 43a, a second edge preparation torch 44 having a nozzle 44a and a differential transformer 45 having a stylus 45a biased in the direction in which the nozzle 43a projects. The arrangement of the second cutting torch 43, second edge preparation torch 44 and stylus 45a on the second torch head 39 is the same as on the first torch head 38. The only difference is that on the second torch head 39, the above mentioned components are displaced 90° clockwise with respect to those on the first torch head 38.

The control box 19 further contains a first rotary type resolver 46 and a second rotary type resolver 47. The first resolver 46 is rotated by a gear 48 intermeshing with the gear 26, and the second resolver 47 is rotated through the gears 26, 25 and 49. While the gears 22, 25, 26, 29 30, 34, 48 and 49 are respectively shown in a single form, they may obviously each be formed of a known type of combination of gears to obtain a desired speed reduction ratio and rotating direction. A transmission 50 comprises the gears 25, 26, 29, 30, 48 and 49.

Referring to FIG. 3, the plunger-cylinder assembly 27 includes an arcuate cylinder 51 whose center $C_0$ falls on the central axis $X_1 - X_1$ of the shaft 23. At that end portion 51a of the cylinder 51 which is connected to the shaft 23 is provided an air duct 52 for conducting compressed air into a cylinder chamber 55 defined within the cylinder 51. That side wall of the aforesaid end portion 51a of the cylinder 51 which is disposed to the air duct is bored with an air passage 53. At the end portion 51a is further provided a relief valve 54 so as to communicate with the cylinder chamber 55 through said air passage 53, thereby maintaining air pressure in the cylinder chamber 55 at a fixed level of, for example, 4 kg/cm$^2$. Into the cylinder 51 is inserted a plunger 56 having an arcuate longitudinal cross section. This plunger 56 is designed to rotate about an axis $X_3 - X_3$ (FIG. 1) passing through the center $C_0$ and perpendicular to a plane defined by a curve $X_2 - X_2$ which passes through the centers of the vertical cross sections of the plunger 56.

As shown in FIGS. 1, 3 and 4, a sensor 57 comprises two arm plates 57a and 57b intersecting each other at right angles, presenting an L-shape plate as a whole. At the pivotal point of the sensor 57 is provided a fixed contact 58. The free end portions of the arm plates 57a and 57b are fitted with differential transformers 59 and 60 respectively. Upwardly biased styluses 59a and 60a connected to the cores (not shown) of the differential transformers 59 and 60 vertically project from the upper surface of the sensor 57 so as to contact the outer surface of the structure to be cut. When the tips of the styluses 59a and 60a are on an imaginary plane A (whose cross section is shown by $A_1 - A_1$ in FIG. 3) parallel with the upper surface of the sensor 57 and including the tip of the fixed contact 58, the differential transformers 59 and 60 are designed to generate no signals. When the tip of the stylus 59a rises above the plane A, the differential transformer 59 produces a positive signal corresponding to the extent to which the tip of the stylus 59a projects from the plane A. When the tip of the stylus 59a is brought nearer to the sensor 57, namely, is retracted from the plane A, the differential transformer 59 sends forth a negative signal corresponding to the amount of said retraction. The other differential transformer 60 generates signals in the reverse way from the preceding case.

One end 56a of the arcuate plunger 56 projects from the free end of the cylinder 51. To the end face of said free end is fixed the central portion of the arm plate 57a of the sensor 57 such that the plane A includes the axis $X_3 - X_3$ and the arm plate 57a of the sensor 57 is disposed parallel with the axis $X_3 - X_3$. With a plane perpendicular to the axis $X_3 - X_3$ designated as B (whose cross section is shown by $B_1 - B_1$ in FIG. 4), the pneumatic plunger-cylinder assembly 27, rotary member 31 and slidable member 32 are so arranged as to render the sliding direction of the slidable member 32, namely, the fourth direction parallel with the aforesaid plane B. Accordingly, the nozzle 40a of the first cutting torch 40 of the first torch head 38 is always positioned perpendicular to the plane A, and that of the second torch head 39 is disposed parallel with the plane A.

In the foregoing embodiment, a hull block 61 partly shown in FIG. 1 is chosen as a structure being thermally cut. This hull block 61 consists of a skin 62, stiffeners 63 erected substantially at right angles thereto and a plate 64 supported by said stiffeners 63 and disposed substantially parallel with the skin 62.

In FIG. 5, there is shown the block circuit diagram for control mechanism for a gas cutting machine according to this invention.

A symbol C designates an input signal to the servo motors 13 and 20 and cooperates with the later described output signals from the resolvers 46 and 47 to control the rotational speeds of the servo motors 13 and 20 in a manner to cause the sensor 57 to travel at a predetermined speed V(FIG. 8) along the underside of the skin 62.

The sensor 57 indicated in solid lines in FIGS. 7 and 9 is assumed to be so disposed as to run along the underside or outer periphery 62a of the skin 62. When the styluses 59a and 60a take a neutral position with respect to the trnasformers 59 and 60, the tip of the stylus 59a and the fixed contact 58 are on that line $A_2-A_2$ in the plane A(FIG. 3), which is inclined through an angle $\theta_1$ from the horizon (FIG. 7), and the tip of the stylus 60a and the fixed contact 58 are on the line $A_1-A_1$ (FIG. 3) which is inclined through an angle $\gamma$ from the horizon (FIG. 9) in a plane which is parallel with the plane B(FIG. 4) and includes the tip of the fixed contact 58. The radius of curvature of the outer periphery 62a of the skin 62 is far larger than a distance between the fixed contact 58 and the stylus 59a, so that the line $A_2-A_2$ may be deemed as the tangential line of that portion of the outer periphery 62a of the skin 62 which is defined between the fixed contact 58 and stylus 59a.

When the arm plate 57a is inclined through an angle other than $\theta_1$, the upwardly biased stylus 59a is displaced from the neutral position in the transformer 59 to an extent corresponding to a difference between said other angle and the angle $\theta_1$. In FIG. 5, this displacement is shown by an input signal $D_1$ which produces a voltage $D_{11}$ in the differential transformer 59. The voltage $D_{11}$ drives the servo motor 24 via an amplifier 67 so as to revolve the rotors of the resolvers 46 and 47 throgh the gears 25, 26 and 48, and the gears 25 and 49, respectively. The servo motor 24 rotates the sensor 58 about the axis 23 through the gears 25, 26, shaft 23 and plunger-cylinder assembly 27 in such a direction that the input signal $D_1$, i.e., the voltage $D_{11}$ diminishes. The rotation of the sensor 58 about the shaft 23 is indicated by a symbol $O_3$ in FIG. 5. The servo motor 24 also causes the rotary member 31 as well as the torch heads 38 and 39 to rotate about the shaft 28 through the gears 25, 26, 30 and 29 to the same extent as the sensor 58 rotates about the shaft 23. The rotation of the rotary member 31 is indicated by a symbol $O_4$ in FIG. 5. In the arrangement of FIG. 5, the rotors of the resolvers 46 and 47 are turned from their neutral position through an angle equal to that defined by the arm plate 57a and horizon. When the input signal $D_1$ diminishes, the arm plate 57a mekes the angle $\theta_1$ with the horizon and the rotors of the resolvers 46 and 47 are also in a state swung through $\theta_1$ from the neutral position.

Where the rotor of the resolver 46 is inclined through $\theta_1$ from the neutral position, the resolver 46 produces output signals $X_1$ and $Y_1$. The signal $X_1$ is transmitted to the servo motor 13 through an adder 65 and controls the servo motor 13 so as to move the gas cutting machine in the X direction at a speed equal to $V \cos \theta_1$. The signal $Y_1$ is transmitted through an adder 66 to the servo motor 20 to control its drive so as to move the control box 19 along the pole 17 at a speed equal to $V \sin \theta_1$.

When the arm plate 57b is inclined through an angle other than $\gamma$, the upwardly biased stylus 60a is displaced from the neutral position in the transformer 60 to an extent corresponding to the difference between said other angle and the angle $\gamma$. In FIG. 5, this displacement is shown by an input signal $D_2$ which produces a voltage $D_{21}$ in the differential transformer 60. Upon receipt of the signal $D_2$, the resolver 47 produces output signals $X_3$ and $Y_3$ which are transmitted through the adders 65 and 66 to the servo motors 13 and 20, respectively. As will be described later, the signal $X_3$ causes the speed of the servo motor 13 to increase or decrease and the signal $Y_3$ drives the servo motor 20 to lift or lower the sensor 57 until the input signal $D_2$, i.e., the voltage $D_{21}$ diminishes. When the voltage $D_{21}$ becomes zero, the arm plate 57b makes the angle $\gamma$ with the horizon in the plane which is parallel with the plane B (FIG. 4) and includes the tip of the fixed contact 58.

As long as the arm plates 57a and 57b remain inclined at the angles $\theta_1$ and $\gamma$ respectively, the gas cutting machine travels in the X direction at the speed of $V \cos \theta_1$ and the sensor 57 is moved along the pole 17 at the speed of $V \sin \theta_1$. Thus, the sensor 57 runs along the line $A_2-A_2$ at the speed of V.

Referring to FIG. 7, the sensor 57 indicated in solid lines is assumed to follow the curved underside of the skin 62 with the arm plate 57a inclined through $\theta_1$ with respect to the horizontal line. The curved sensor 57 is moving at the velocity indicated by the vector $\dot{V}_1$ whose absolute value is V, with the fixed contact 58 of the sensor 57 and that stylus 59a of the arm plate 57a of said sensor 57 which is in neutral position in the transformer 59 contacted by a line $A_1 - A_1$ on the plane A (FIG. 3), so that no output is generated by the differential transformer 59.

Now let an xy coordinate system be considered in which, as shown in FIG. 8, the $x-x'$ axis is disposed parallel with the X-axis and the $y-y'$ axis parallel with the Y-axis, with the tail of the vector $\dot{V}_1$ taken as the origin. Where there is added to the vector $\dot{V}_1$ a vector $\dot{v}$ disposed at right angles to the vector $\dot{V}_1$ and having an absolute value $|V\Delta\theta_1|$, then there is obtained a vector $\dot{V}_2$. Here, the vector $\dot{V}_2$ is assumed to have an inclination $(\theta_1 + \Delta\theta_1)$ to the $x-x'$ axis. With $\Delta\theta_1$ taken to represent an infinitesimal angle, $\dot{V}_1$ and $\dot{V}_2$ may be deemed to have an equal absolute value V.

Similarly, when a vector $\dot{V}$ having an inclination $\theta$ with respect to the $x-x'$ axis and the absolute value V is added by a vector $\dot{V}^1$ which is perpendicular to the vector $\dot{V}$ and has an absolute value $|V\Delta\theta|$ ($\Delta\theta$ being an infinitesimal angle), there is obtained a vector $\dot{V}^1$ having an inclination $(\theta + \Delta\theta)$ with respect to the $x-x'$ axis and an absolute value equal to the vector $\dot{V}$. Accordingly, the vector $\dot{V}^1$ derived by adding the vector $\dot{v}$ to the vector $\dot{V}$ does not change in substantial magnitude, though said vector $\dot{V}^1$ may have a different direction.

According to this invention based on the abovementioned principle, the sensor 57 is designed, as later described, to follow the underside 62a of the skin 62 at a fixed speed.

Referring to FIG. 7, where, in case the skin 62 has a curved outer periphery 62a, the sensor 57 moves from the position indicated in solid lines (hereinafter referred to as the "original position") at a velocity $\dot{V}_1$ for an extremely short time, then the stylus 59a of the differential transformer 59 will move upward or downward from the plane A (upward in the case of FIG. 7). (This movement is indicated by a signal $D_1$ in FIG. 5.) Accordingly, the differential transformer 59 produces differential voltage $D_{11}$ corresponding to said movement signal $D_1$. Said voltage $D_{11}$ is amplified by an amplifier 67, for the drive of the servo motor 24.

The rotation of the servo motor 24 is transmitted by the gears 25 and 26 of the transmission system 50, shaft 23 and plunger-cylinder assembly 27, causing the arm 57a of the sensor 57 to rotate about the $X_1 - X_1$ axis (shown in FIGS. 1 and 3) in such direction as reduces the voltage of the differential transformer 59 to zero. Here, the amount of the rotation of the arm 57a is designated as $\Delta\theta_1$. Said rotation is transmitted by the gears 26 and 48 of the transmission system 50 to rotate the rotor of the resolver 46 through an angle $\theta_1 + \Delta\theta_1$ and also transmitted by the gears 26, 25 and 49 to rotate the resolver 47 through an angle $\Delta\theta_1$. Where there is not supplied any input from the later described differential transformer 60, the rotor of the resolver 47 is advanced 90° in phase from the rotor of the resolver 46. Accordingly, when the rotor of the resolver 46 takes a new position by making an inclination of $(\theta_1 + \Delta\theta_1)$, then the rotor of the resolver 47 will have a phase angle of $(\theta_1 + \Delta\theta_1 + 90°)$. Where the resolver 47 rotates through an angle $\Delta\theta_1$, there is excited voltage $Eo(\Delta\theta_1)$ in the primary coil of said resolver 47 and the adder 65 is supplied with an input expressed by the following equation:

$$X_2 = Eo\ (\Delta\theta_1)\cos(\theta_1 + 90°),$$

causing the truck 11 to run along the X-axis at a speed decreased by $V\Delta\theta_1\sin\theta_1$. The other adder 66 is supplied with an input expressed by the following equation:

$$Y_2 = Eo\ (\Delta\theta_1)\sin(\theta_1 + 90°),$$

causing the control box 19 to travel along the Y-axis at a speed increased by $V\Delta\theta_1\cos\theta_1$. A composition of amounts of speed variation along the X and Y axes is nothing but the vector $\dot{v}$ of FIG. 8. As shown in dotted lines in FIG. 7, therefore, the sensor 57 is inclined through an angle $\theta_1 + \Delta\theta_1$ from its original position after an infinitesimal time $\Delta t$ and driven at a velocity $\dot{V}_2$. Accordingly, the sensor 57 follows the outer periphery 62a of the skin 62 at a substantially fixed speed, though said periphery may be curved.

FIG. 6 is an electric circuit diagram of a combination of the resolvers 46 and 47 and adders 65 and 66 of FIG. 5. Both resolvers 46 and 47 are coupled by the gears 48, 26, 25 and 49 (FIG. 1) such that the rotor of the resolver 47 is advanced 90° in phase from that of the resolver 46. The notations $R_1$ to $R_{16}$ in FIG. 6 denote suitably selected resistors.

The foregoing description refers to the case where the sensor 57 made a small rotation only about the $X_1 - x_1$ axis. There will now be described the case where the sensor 57 presents varying degrees of inclination from a plane perpendicular to the plane B of FIG. 4 and including the axis of the shaft 23 when the arm 57b follows the underside 62a of the skin 62.

FIG. 9 presents in solid lines the conditions of the sensor 57, plunger-cylinder assembly 27 and shaft 23 when the sensor 57 stands at the original position indicated in solid lines in FIG. 3, with the aforesaid inclination of the arm 57b designated as $\gamma$. Now let it be assumed that after the infinitesimal time $\Delta t$, the arm 57b has its inclination varied by $\Delta\gamma$ in the B plane. Then the plunger-cylinder assembly 27 has to move along the B plane for a distance indicated by L. This L represents a product of a distance from the center $C_0$ of the plunger-cylinder assembly 27 to the top of the fixed contact 58 multiplied by $\Delta\gamma$. In the case of FIG. 9, $\Delta\gamma$ denotes variation in clockwise angles, so that the plunger-cylinder assembly 27 and shaft 23 are brought down by the extent of L. Conversely where $\Delta\gamma$ shows variation in counterclockwise angles, then the plunger-cylinder assembly 27 and shaft 23 have to be lifted by the same extent of L.

Since the plunger-cylinder assembly 27 moves only for the infinitesimal time $\Delta t$, it is only required to move, as shown in FIG. 10, at a large speed $L/\Delta t$ in the direction designated by 68 parallel with the B plane (FIG. 4) and $X - Y$ plane. This means that the truck 11 has only to move along the X-axis at a speed $L/\Delta t \sin\theta$ indicated by 69 and the control box 19 along the Y-axis at a speed $L/\Delta t \cos\theta$ indicated by 70.

The speed 69 along the X-axis and the speed 70 along the Y-axis are provided in the following manner.

When the outer periphery 62a of the skin 62 is inclined, as shown in FIG. 9, through an angle $\Delta\gamma$ from the $A_1 - A_1$ line, the stylus 60a makes a movement from its neutral position to an extent corresponding to said inclination, said movement being indicated by a signal $D_2$ in FIG. 5. When the signal $D_2$ is supplied to the differential transformer 60 in FIG. 5, then said transformer 60 produces voltage $D_{21}$ proportional to the angle $\Delta\gamma$ of the above-mentioned inclination. Said voltage $D_{21}$ is conducted to the resolver 47, thereby adding, as shown in FIG. 6, excitation voltage $E^1$ to the voltage Eo excited in the primary coil of the resolver 47. Said added excitation voltage $E^1$ is designed to have such a large magnitude as mentioned below. Referring to FIGS. 5 and 6, an output $X_3 = E^1\cos(\theta + 90°)$ from the resolver 47 is conducted to the adder 65 and to the servo motor 13, causing the truck 11 to travel along the X axis at a speed changed by $L/\Delta t \sin\theta$. On the other end, an output $Y_3 = E^1\sin(\theta + 90°)$ from the resolver 47 is supplied to the other adder 66 and, after amplified, to the servo motor 20, causing the control box 19 to travel along the Y-axis at a speed changed by $(-L/\Delta t \cos\theta)$. As the result, the plunger-cylinder assembly 27 moves at the speed designated by 68 in FIG. 10.

When, in FIG. 9, the plunger-cylinder assembly 27 moves from the solid line to the dotted line position, the end portion 56a of the plunger 56 rotates about the rotation center $C_0$ of said plunger 56, causing the arm 57b of the sensor 57 to rotate through $\Delta\gamma$ from the angle $\gamma$, thereby attaining a new angle $\gamma + \Delta\gamma$. Where the arm 57b rotates clockwise, the plunger-cylinder assembly 27 falls, causing the end portion 56b of the plunger 56 to be pushed (FIG. 3) by the compressed air introduced into the cylinder chamber 55 of the cylinder 51 through the duct 52. As the result, the plunger 56 rotates clockwise about the center Co to push up the fixed contact 58 so as to prevent it from being separated from the outer periphery 62a of the skin 62. Where the arm 57b rotates counterclockwise, the plunger-cylinder assembly 27 is lifted, so that the end portion 56a of the plunger 56 is pushed downward by the fixed contact 58 agaist the pressure of the compressed air in the cylinder chamber 55. Thus the plunger 56 rotates counterclockwise about the center Co to reduce the inner volume of the cylinder chamber 55. Though, at this time, the air in the cylinder chamber 55 tends to have an increased pressure, the air is allowed to escape from the chamber 55 into the atmosphere through the air passage 53 and relief valve 54 (FIG. 3), when said pressure exceeds a prescribed level. Therefore, the sensor 57 unfailingly follows the outer periphery 62a of the skin 62 at an equal speed along the X-axis. The notations $O_1$, $O_2$, $O_3$ and $O_4$ in FIG. 5 respectively represent an output for the truck 11 to be driven alon the X axis by the servo motor 13, an output for the control box 19 to be moved along the pole 17 by the servo motor 20, an output from the transmission system 50 for causing the plunger-cylinder assembly 27 to rotate about the shaft 23 and an output from said transmission system 50 for causing the rotary member 31 to rotate about the shaft 28.

As previously described, the shafts 23 and 28 rotate in the same direction and through the same angle by means of the gears 26, 30 and 29. Where, therefore, the arm 57b of the sensor 57 is not inclined at all, the nozzle 40a of the cutting torch 40 of the first torch head 38 is always positioned toward the upper surface of the sensor 57 or at right angles to the A plane (FIG. 3). In this case, the nozzle 40a takes a position parallel with the normals of the sensor 57 and the outer periphery 62a of the skin 62. Where the arm 57b is inclined, and/or where there arises change in the inclination of the arm 57b during the movement of the sensor 57, the locus of the tip of the nozzle 40a substantially agrees with the envelope defined by the arm 57b when it is made to move parallel in a plane parallel with the X – Y plane.

Now let the case be considered where the plate 64 and stiffener 63 are thermally cut along $F_1 - F_1$ and $F_2 - F_2$ lines of FIG. 1 to form erection joints for a hull block 61. A plane F (FIG. 1) defined by the $F_1 - F_1$ and $F_2 - F_2$ lines is made parallel with the X – Y plane to include the fixed contact 58 of the sensor 57 and the axis of the differential transformer 59 by the required setting of the hull block. The second torch head 39 is retracted in advance by the plunger-cylinder assembly 27 to be prevented from striking the hull block 61.

The truck 11 is moved along the X-axis to bring the sensor 57 right below the point at which cutting is to be commenced. The control box 19 is lifted along the pole 17 by the servo motor 20, causing the fixed contact 58 of the sensor 57 and the styluses 59a and 60a of the differential transformers to touch the outer periphery 62a of the skin 62. The first torch head 38 is set to dispose the tip of the nozzle 40a of the torch 40 in the plane F so as to separate the tip of the nozzle 40a from the plate 64 for a prescribed distance. Upon completion of the above-mentioned operation, the servo motors 13 and 20 are supplied, as shown in FIG. 5, with the signal C giving instructions (FIG. 5) to commence the operation of the gas cutting machine. Where the loci defined by the $F_1 - F_1$ line and the tip of the nozzle 40a make a parallel movement with each other in a plane parallel with the X – Y plane, then the distances from the tips of the nozzles 40a and 41a of the torches 40 and 41 to the plate 64 are made substantially equal. In addition to that, the nozzles 40a and 41a move at the same speed along the $F_1 - F_1$ line, thus enabling substantially the same amount of heat to be applied by the torches 40 and 41 to the portions of the plate 64 where cutting is to be effected and also where a weldable edge is to be formed. Therefore, cutting of the plate 64 and edge preparation thereon are always carried out under substantially the same condition to provide an erection joint having accurate dimensions. If the surface of the plate 64 is shaped as desired, let it be assumed that the tip of the running nozzle 40a will define a locus G—G in FIG. 11.

In fact, however, it often happens that the plate 64 is slightly displaced due to manufacturing tolerances from the locus G—G. Where the tip of the nozzle 40a of the torch 40 is separated from the plate 64 for a prescribed distance (indicated by J in FIG. 11), the differential transformer 42 of the torch 38 does not produce any output. But where the tip of the nozzle 40a is displaced from said distance as indicated by M, then the differential transformer 42 produces an output corresponding to the extent of the displacement M and the direction in which it occurs.

Referring to FIG. 11, a $G_1 - G_1$ line is an imaginary line parallel with; and separated at a distance J from the locus G—G of the tip of the nozzle 40a. Let it be assumed that said imaginary $G_1 - G_1$ line intersects the $F_1 - F_1$ line at point H on the plate 64. Where the stylus 42a of the differential transformer 42 contacts the plate 64 at point H, then said differential transformer 42 will not generate any differential voltage. Where the imaginary $G_1 - G_1$ line falls on the $F_1 - F_1$ line, the differential transformer 42 will not produce any differential voltage, when the torch head 38 is brought to a position indicated in dotted lines. However, where the $F_1 - F_1$ line is inclined, as shown in FIG. 11, through an angle $\alpha$ to the imaginary $G_1 - G_1$ line, then the stylus 42a of the differential transformer 42 will be displaced to an extent indicated by M.

Referring to FIG. 12, a signal $D_3$ denotes the displacement of the stylus 42a. Said signal $D_3$ is conducted to the differential transformer 42, which in turn produces differential voltage in an amount corresponding to the extent of said displacement and the direction in which it occurs. Said differential voltage is amplified for rotation of the servo motor 35. The slidable member 32 is driven by the output signal $O_8$ of said servo motor 35 until said differential voltage is extinguished. As the result, the torch head 38 is brought to a position indicated in solid lines, providing the distance J between the tip of the torch 40a and the plate 64. Where the plate 64 has irregularities on the surface, the stylus 42a follows said surface to cause the transformer 42 to detect the amounts of said irregularities, thereby enabling the torch head 38 to be corrected in position.

Accordingly, the differential transformer 42 enables the cutting of the plate 64 and the preparation of a weldable edge thereon to be effected at the same speed, with an equal amount of heat applied to said plate 64 by the torches 40 and 41.

There will now be described the cutting of a stiffener 63 and the preparation of a weldable edge thereon. The torch head 38 is retracted by operation of the plunger-cylinder assembly 27 so as to prevent the torch head 38 from striking the stiffener 63. Adjustment is made of the position of the truck 11 on the X-axis, that of the control box 19 on the Y-axis and that of the slidable member 32 with respect to the rotary member 31 so as to bring the torch head 39 to a starting position on the $F_2 - F_2$ line of FIG. 1. At this time the stylus 45a of the differential transformer 45 is kept in contact with the stiffener 63, and made to take a neutral position, thereby preventing the differential transformer 45 from producing any differential voltage. Further, the sensor 57 is set in a condition in which it can follow the outer periphery 62a of the skin 62.

If the stiffener 63 is inclined through an angle $\theta$ to the Y-Z plane, the nozzle 43a of the torch head 39 will be set so as to be inclined through an angle $\theta$ (FIG. 13) to the horizontal X - Z plane.

Upon completion of the aforementioned setting, the differential transformer 60 is electrically disconnected from the resolver 47, and the resolver 46 from the adder 65, though they are all shown in an electrically connected state in FIG. 5. Stiffener 63 is worked under control of a control mechanism shown in FIG. 14. Referring to FIG. 14, the servo motors 13 and 20 are supplied with the signal C giving instructions to commence operation. The resolver 47 receives a signal $D_4$ in the primary coil of the resolver 47 as that in FIG. 5 for actuating the torch head 39 from the output source (not shown), said signal $D_4$ exciting the same voltage Eo. Thus the cosine component $X_4$ of the voltage excited in the primary coil of the resolver 47 is conducted through the adder 65 to the servo motor 13 for control of its rotation. As the result, the gas cutting machine is made to travel at a speed V sin $\theta$ along the X-axis. The sine component $Y_4$ of the above-mentioned excited voltage is supplied through the adder 66 to the servo motor 20 for control of its rotation, thereby causing the control box 19 to move along the pole 17 at a speed V cos $\theta$. Therefore, the torch head 39 is made to move at the speed V along a plane inclined through the angle $\theta$ to the Y - Z plane. A signal $D_5$ (FIG. 14) represents the displacement N of the stylus 45a of the differential transformer 45 where the stiffener 63 is inclined, as shown in FIG. 13, through an angle $\beta$ to the $F_2 - F_2$ line. Said signal $D_5$ is conducted to the differential transformer 45 and the differential voltage generated thereby is supplied to the adder 65 for rotation of the servo motor 13. As the result, the gas cutting machine travels along the X-axis with its speed varied until the above-mentioned displacement N is extinguished. The R — R line and point K of FIG. 13 correspond to the $G_1 - G_1$ line and point H of FIG. 11. As the result, the nozzle 43a always maintains a fixed distance from the stiffener 63 and moves along said stiffener 63 at a fixed speed. This enables the stiffener 63 to be thermally cut exactly along the $F_2 - F_2$ line and also a weldable edge to be formed with accurate dimensions at any desired part of the stiffener 63. The notations $O_5$, $O_6$ and $O_7$ respectively represent an output from the servo motor 13 for causing the truck 11 to be driven along the X axis in thermally cutting the stiffener 63, an output from the servo motor 20 for causing the control box 19 to be driven along the pole 17, and an output from the transmission system 50 for rotation of the rotary member 31 in the arrangement in FIG. 14. The positions where the torch heads 38 and 39 commence and complete the working of the plate 64 and stiffener 63 may be determined by known position-detecting means, for example, microswitches. In addition to such position-detecting means, there may be used known sequence-control means for effecting the automatic operation of the gas cutting machine.

There will now be described the case where there is formed on the stiffener 63, as shown in FIG. 15, a cut plane including the $F_3 - F_3$ line which is inclined through an angle $\delta$ to the perpendicular $Y_1 - Y_1$. To this end, it is only required that the pole 17 be inclined in a plane parallel with the Y-Z plane so as to cause the nozzle 43a of the cutting torch 43 of the second cutting head 39 to travel with the extension of said nozzle 43a always directed to the $F_3 - F_3$ line.

What we claim is:

1. A gas cutting machine comprising:
a truck movable in a first direction;
a pole pivoted at one end thereof on the truck and extending in a second direction perpendicular to the first direction;
a sensor rotatable about a first shaft extending in a third direction perpendicular to the first and second directions and also about an axis perpendicular to said shaft so as to follow the guide plane of a block structure by moving along the pole;
sensor rotating means fixed to one end of the first shaft for causing the sensor to rotate about said axis;
a first torch head provided with a first cutting torch, said torch rotating about a second shaft disposed parallel with the first shaft and movable with the first shaft along the pole, and moving in a fourth direction along a plane including the normal of the guide plane of the block structure and parallel with the third direction and also along a plane perpendicular to the first and second directions, with the nozzle of said torch always oriented in the fourth direction;
transmission means for transmitting the rotation of the first shaft to the second shaft to cause said second shaft to rotate in the same direction and through the same angle as said first shaft; and
a control mechanism for causing the sensor to rotate about the first shaft so as to render said sensor parallel with the guide plane of the block structure and for regulating the speed at which the truck is made to run in the first direction according to the angle through which the sensor rotates about the first shaft and said axis and also the speed at which the first torch head is made to move along the pole, thereby allowing the sensor to move at a predetermined constant speed along a plane parallel with the first and second directions, while following the guide plane of the block structure.

2. A gas cutting machine according to claim 1 wherein the sensor-rotating means comprises a plunger-cylinder assembly including an arcuate cylinder fixed at one end to the first shaft and having the center disposed on said axis perpendicular to the first shaft; an arcuate plunger so inserted into the cylinder as to slide coaxially therethrough, one end of said plunger being pushed outward from the other end of the cylinder by the compressed air introduced into a cylinder chamber defined within the said one end of the cylinder and fitted with the sensor; and a check valve communicating with the cylinder chamber for maintaining air pressure in said chamber at predetermined pressure.

3. A gas cutting machine according to claim 2 wherein the sensor comprises a plate member having a first arm extending along a plane parallel with the first and second directions and a second arm extending along a plane parallel with the second and third directions and intersecting the first arm at right angles; a fixed contact is formed on one side of said sensor at the pivotal portion thereof for abutting against the guide plane of the structural member; and first and second differential transformers are provided on the first and second arms, respectively, and each having a stylus projecting from said one side of the sensor and reciprocable in a direction perpendicular to said one side, whereby differential voltages generated by the differential transformers in an amount corresponding to the movement of the stylus are conducted to the control mechanism.

4. A gas cutting machine according to claim 3 wherein the control mechanism comprises a first amplifier for amplifying the differential voltage generated by the first differential transformer; a first servo motor for rotating said first shaft about an axis extending in a third direction perpendicular to the first and second directions, said servo motor being driven at a prescribed speed according to the differential voltage amplified by the amplifier; a first resolver actuated by the servo motor through the transmission means; a second resolver operable by the servo motor through the transmission means as well as by the differential voltage generated by the second differential transformer and, where the second differential transformer does not produce any differential voltage, advanced 90° in phase from the first resolver; a first adder for receiving and amplifying the cosine components of the voltages excited in the first and second resolvers; a second servo motor having the speed thereof controlled by the first adder for causing the truck to travel in the first direction at a prescribed speed; a second adder for receiving and amplifying the sine components of the voltages excited in the first and second resolvers; and a third servo motor having its speed controlled by the second adder for causing the first torch head and sensor to move along the pole at a prescribed speed.

5. A gas cutting machine according to claim 4 further comprising a rotary member fixed to the second shaft at right angles; a slidable member provided with the first torch head and slidably mounted on the rotary member along a fourth direction in which the nozzle of the cutting torch of the first head is positioned; a rack provided on the slidable member so as to extend in the direction in which said slidable member is moved; and a fourth servo motor operable by the joint action of said rack and gearing provided on the fourth servo motor and engaged therewith so as to cause the slidable member to travel in said fourth direction.

6. A gas cutting machine according to claim 5 wherein the first torch head includes an edge preparing torch disposed in a plane including the cutting torch and perpendicular to the first and second directions, the nozzle of said edge preparing torch being inclined through a prescribed angle toward the nozzle of the cutting torch.

7. A gas cutting machine according to claim 5 wherein the first torch head is provided with a third differential transformer for generating a differential voltage by the action of a stylus thereof disposed in parallel with the first cutting torch in a plane including the cutting torch of said first torch head and in parallel with the third direction and conducting said differential voltage to the fourth servo motor for its drive, thereby causing the slidable member to move until said differential voltage is extinguished.

8. A gas cutting machine according to claim 5 wherein the first torch head is provided with a first plunger-cylinder assembly for moving said first torch head along the third direction, said first plunger-cylinder comprising a cylinder extending in the third direction and fixed to the slidable member and a plunger extending from the cylinder and carrying the first torch head at one end.

9. A gas cutting machine according to claim 5 wherein the slidable member includes a second torch head comprising second cutting torch provided with a nozzle disposed at right angles to the nozzle of the first cutting torch of the first torch head.

10. A gas cutting machine according to claim 9 wherein the second torch head includes an edge preparing torch disposed in a plane including the second cutting torch in parallel with the third direction, the nozzle of said edge preparing torch of the second torch head being inclined through a prescribed angle toward the nozzle of the second cutting torch.

11. A gas cutting machine according to claim 9 wherein the second torch head is provided with a fourth differential transformer for generating a differential voltage by the action of a stylus thereof disposed in parallel with said second cutting torch in a plane including the second cutting torch and in parallel with the third direction and conducting said differential voltage to the second servo motor for the drive thereof, thereby causing the truck to move along the first direction until said differential voltage is extinguished.

12. A gas cutting machine according to claim 9 wherein the second torch head is provided with a second plunger-cylinder assembly for moving said second torch head along the third direction, said plunger-cylinder assembly comprising a cylinder extending in the third direction and fixed to the slidable member and a plunger extending from said cylinder and carrying said second torch head at one end.

13. A gas cutting machine according to claim 1 wherein there is further provided between the pole and truck a hydraulic jack for rotating said pole in a plane parallel with the first and third directions.

* * * * *